US009229564B2

(12) United States Patent
Chen et al.

(10) Patent No.: US 9,229,564 B2
(45) Date of Patent: Jan. 5, 2016

(54) TOUCH DISPLAY AND ELECTRONIC DEVICE (71) Applicant: HTC Corporation, Taoyuan County (TW)

(72) Inventors: Te-Mu Chen, Taoyuan County (TW); Pi-Lin Lo, Taoyuan County (TW); Cheng-Hsi Liu, Taoyuan County (TW); Yi-Fan Hsueh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 140 days.

(21) Appl. No.: 13/741,392

(22) Filed: Jan. 15, 2013

(65) Prior Publication Data

US 2013/0181923 A1 Jul. 18, 2013

Related U.S. Application Data (60) Provisional application No. 61/587,674, filed on Jan. 18, 2012.

(51) Int. Cl.
*G06F 3/044* (2006.01)
*G06F 3/041* (2006.01)

(52) U.S. Cl.
CPC .............. *G06F 3/0412* (2013.01); *G06F 3/044* (2013.01)

(58) Field of Classification Search
CPC ..... G06F 3/041; G06F 3/0412; G06F 3/0416; G06F 3/044; G06F 3/047; G06F 3/0487–3/04886; G09G 3/36–3/3696
USPC .............................. 345/156, 173, 174, 87–104
See application file for complete search history.

(56) References Cited

U.S. PATENT DOCUMENTS

| 5,432,626 | A | * | 7/1995 | Sasuga et al. ................... 349/58 |
| 2009/0194344 | A1 | * | 8/2009 | Harley et al. .............. 178/18.06 |
| 2010/0078230 | A1 | | 4/2010 | Rosenblatt et al. |
| 2010/0194698 | A1 | * | 8/2010 | Hotelling et al. ............. 345/173 |
| 2010/0200309 | A1 | * | 8/2010 | Yilmaz et al. .............. 178/18.03 |
| 2010/0258360 | A1 | | 10/2010 | Yilmaz |
| 2011/0063229 | A1 | | 3/2011 | Krah et al. |
| 2011/0163766 | A1 | | 7/2011 | Geaghan |

(Continued)

FOREIGN PATENT DOCUMENTS

| EP | 0786745 | 7/1997 |
| TW | I241526 | 10/2005 |

(Continued)

OTHER PUBLICATIONS

"Search Report of Europe Counterpart Application", issued on Jun. 5, 2013, p. 1-p. 3.

(Continued)

*Primary Examiner* — Nathan Danielsen
(74) *Attorney, Agent, or Firm* — Jianq Chyun IP Office (57) ABSTRACT An electronic device and a touch display panel of the electronic device are provided. The touch display panel receives a touch driving signal and generates a sense signal in response to the touch driving signal, wherein the sense signal is analyzed to calculate a touch position on the touch display. The touch display panel includes a transmitting circuit and a grounding electrode. The transmitting circuit distributes the touch driving signal in the touch display panel. The grounding electrode is disposed over the transmitting circuit and at least partially covers the transmitting circuit, wherein the grounding electrode is a grounded conductor.

22 Claims, 8 Drawing Sheets

(56) References Cited

U.S. PATENT DOCUMENTS

| | | |
|---|---|---|
| 2011/0267305 A1 | 11/2011 | Shahparnia et al. |
| 2012/0262387 A1 | 10/2012 | Mizuhashi et al. |

FOREIGN PATENT DOCUMENTS

| | | |
|---|---|---|
| TW | 201107503 | 8/2008 |
| TW | 201017496 | 5/2010 |
| TW | 101825791 | 9/2010 |
| TW | 102109690 | 6/2011 |

OTHER PUBLICATIONS

"Office Action of Taiwan Counterpart Application", issued on Jan. 9, 2015, p. 1-p. 3.

"Office Action of Chinese Counterpart Application", issued on Jun. 3, 2015, p. 1-p. 16.

* cited by examiner

TOUCH DISPLAY AND ELECTRONIC DEVICE

CROSS-REFERENCE TO RELATED APPLICATION

This application claims the priority benefits of U.S. provisional application Ser. No. 61/587,674, filed on Jan. 18, 2012. The entirety of the above-mentioned patent applications is hereby incorporated by reference herein and made a part of this specification.

BACKGROUND OF THE INVENTION

1. Field of the Invention

The present invention relates to an electronic device and a touch display of the electronic device. More particularly, the present invention relates to a touch display with a grounding shield integrated in the touch display.

2. Description of the Related Art

Figure 1:
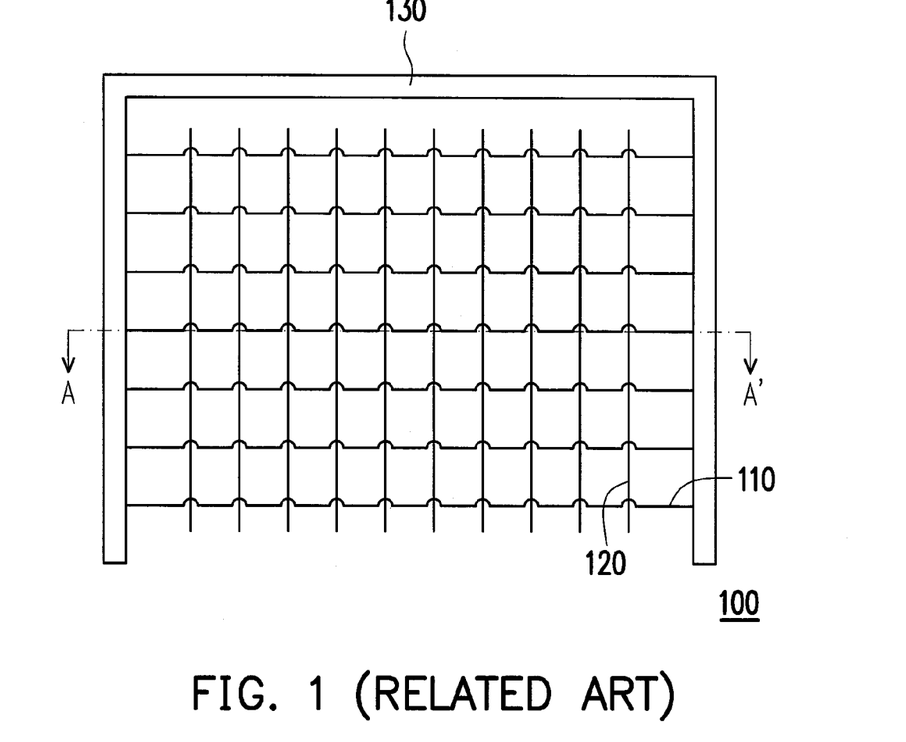
FIG. 1 is a schematic view from above of a part of a conventional touch display panel integrated with a touch sensor.

FIG. 1 is a schematic view from above of a part of a conventional touch display panel 100. The touch sensor may be capacitance type touch sensor with a pair of electrodes disposed to face each other with a dielectric body in between. Please refer to FIG. 2 for the drive line 110 as a first electrode and the sense line 120 as a second electrode. The display panel 100 further includes a transmitting circuit 130. The transmitting circuitry 130 is coupled to the drive lines and scans the drive lines by distributing a touch driving signal to each drive line according to a preset sequence. The sense lines generate a sense signal in response to the touch driving signal. It is achieved by transmitting the touch driving signal to the drive line to generate electric field and the sense line receives the energy of the electric filed and generates the sense signal. The sense signal may be analyzed by an external circuitry to calculate the touch position of the user on the touch display 100.

Figure 2:
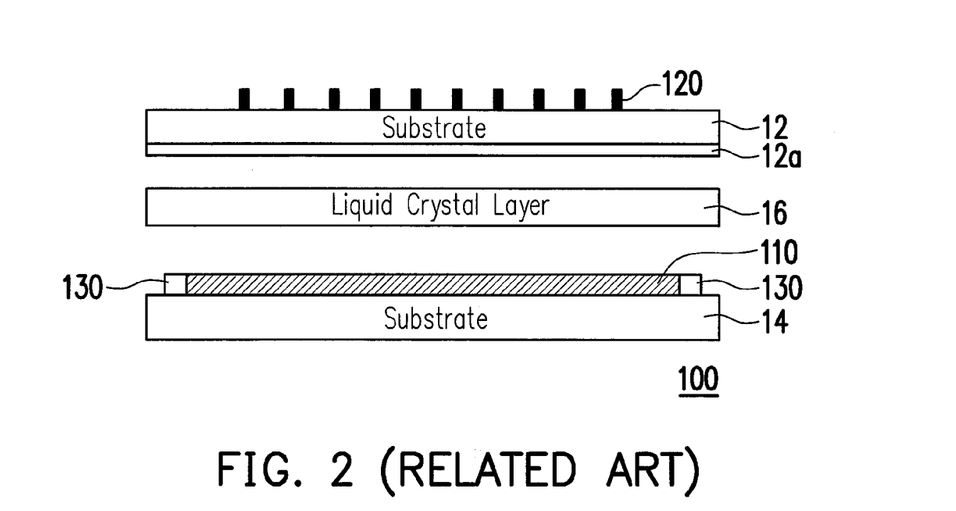
FIG. 2 is a cross-sectional view of a conventional touch display panel integrated with a touch sensor.

FIG. 2 is a cross-sectional view of the AA' line in FIG. 1. The touch display panel 100 further includes a first substrate 14, a liquid crystal layer 16, a color filter layer 12a, and a second substrate 12. The plurality of sense lines (the second electrodes) are disposed on the second substrate 12. The plurality of drive lines (the first electrodes) are disposed between the liquid crystal layer 16 and the first substrate 14. The plurality of drive lines and the plurality of sense lines constitute a capacitive touch sensor integrated in the touch display panel 100. The transmitting circuit 130 is disposed on at least one side of the drive line to transmit the touch driving signal to the drive line.

Figure 3:
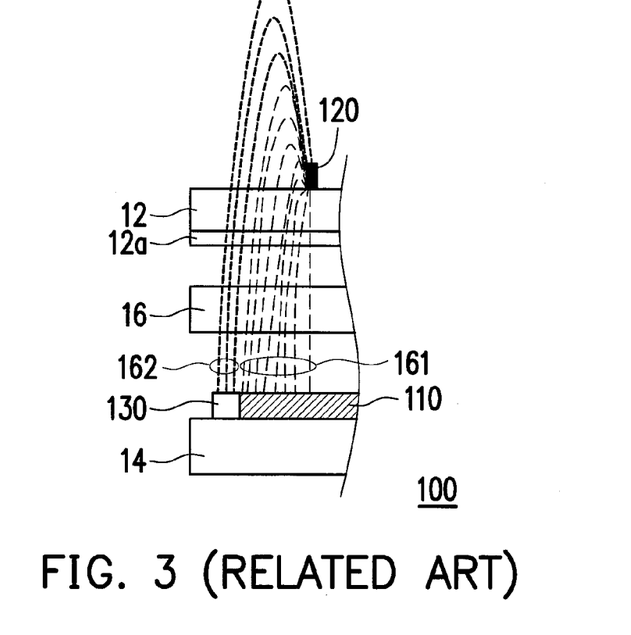
FIG. 3 is a schematic diagram showing the electrical field in a part of a conventional touch display panel integrated with a touch sensor.

FIG. 3 is a schematic diagram showing the electrical field in a part of the display panel 100. When the transmitting circuit 130 scans the drive lines, a normal electric field 161 is generated by the drive line 110, and the sense line 120 received the energy generated by the normal electric field 161 and generates the sense signal. The transmitting circuit 130 transmitting the touch driving signal to the drive line may generated another electrode field that may be received by the sense electrode 120 as the fringe electric field 162 formed between the transmitting circuit 130 and the sense line 120. The normal electric field 161 and the fringe electric field 162 are depicted by two types of dotted lines in FIG. 3, respectively.

The normal electric field 161 appears only when the transmitting circuit 130 sends the touch driving signal to the drive line 110. The normal electric field 161 does not appear when the transmitting circuit 130 sends the touch driving signal to the other drive lines. The normal electric field 161 is mandatory for the touch detection around the drive line 110. Assume that the fringe electric field 162 does not exist and there is only the normal electric field 161. The electrical environment changes when a human hand enters the normal electric field 161, with a portion of the electric field being directed to ground instead of terminating at the sense line 120. The sense signal reflects the resultant decrease in capacitance so that the touch of the user can be detected.

On the other hand, the fringe electric field 162 originates in the intense AC driving signal in the transmitting circuit 130. The fringe electric field 162 appears when the transmitting circuitry 130 sends the touch driving signal to the drive line 110 or another nearby drive line. The fringe electric field 162 is undesirable because the fringe electric field 162 affects the field strength at the sense line 120 and interferes with the sense signal, which induces erroneous results of touch detection.

SUMMARY OF THE INVENTION

Accordingly, the present invention is directed to an electronic device and a touch display panel integrated with a touch sensor. The touch display panel includes a grounding electrode or a grounding shield to prevent the fringe electric field from being received by the sense line.

According to an embodiment of the present invention, a touch display panel is provided. The touch display panel includes a touch sensor, two substrates, a liquid crystal layer, a transmitting circuit, and a grounding electrode. The touch sensor has a plurality of first electrodes for receiving a touch driving signal and a plurality of second electrodes for generating a sense signal according to the touch driving signal. The second substrate is disposed opposite to and above the first substrate, wherein the plurality of second electrodes are disposed on the second substrate. The liquid crystal layer disposed between the first substrate and the second substrate. The transmitting circuit transmits the touch driving signal to the plurality of first electrodes, wherein the transmitting circuit and the plurality of first electrodes are disposed between the first substrate and the liquid crystal layer or between the second substrate and the liquid crystal layer. The grounding electrode is configured to electrically connect to a ground and is disposed above and at least partially overlapped with the transmitting circuit.

According to another embodiment of the present invention, an electronic device is provided. The electronic device includes the aforementioned touch display panel, a drive circuitry and a sense circuitry. The sense circuitry is coupled to the plurality of second electrodes for receiving the sense signal generated by the plurality of second electrodes. The drive circuitry is coupled to the transmitting circuit and generates the touch driving signal for driving the plurality of first electrodes.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 4:
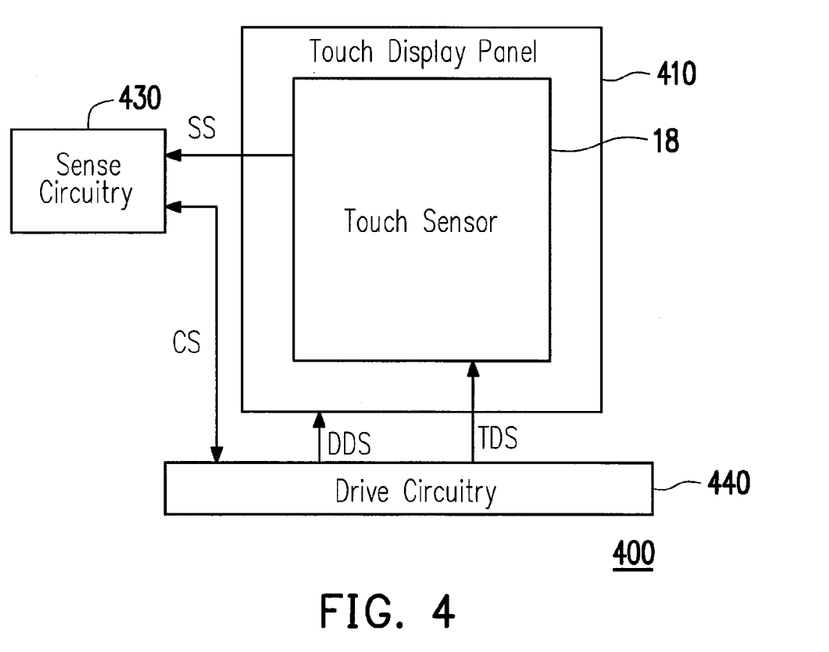
FIG. 4 is a schematic diagram showing an electronic device according to an embodiment of the present invention.

FIG. 4 is a schematic diagram showing an electronic device 400 according to an embodiment of the present invention. The electronic device 400 may be any electronic device that can respond to the touch of the user, such as a smart phone, a personal digital assistant (PDA), a tablet computer, a notebook computer, a desktop computer, or a vending machine. The electronic device 400 includes a sense circuitry 430, a drive circuitry 440, and a touch display panel 410 integrated with a touch sensor 18. The drive circuitry 440 is coupled to the sense circuitry 430. The display panel 410 is coupled to the sense circuitry 430 and the drive circuitry 440.

The touch display panel 410 may include a capacitive touch sensor 18. The capacitive touch sensor 18 is integrated with the display panel 410 and receives a touch driving signal TDS and generates a sense signal SS in response to the touch driving signal TDS. The touch display panel 410 further comprises a first substrate, a second substrate and a liquid crystal layer placed between the first substrate and the second substrate. The LCM may be any type, such as the in-plane switching (IPS) type, the vertical alignment (VA) type, or the twisted nematic (TN) type. The sense circuitry 430 analyzes the sense signal SS to calculate the touch position of the user on the touch display 410. The drive circuitry 440 is coupled to the touch display panel 410 and supplies a driving signal such as a common voltage for driving the liquid crystal layer by sending a driving signal DDS to the touch display panel 410.

The control signal CS is used for the handshaking mechanism between the sense circuitry 430 and the drive circuitry 440. The display driving signal DDS may includes image data for displaying the image and a common voltage signal (Vcom signal). The LCM generates a lot of noises when the pixels of the LCM load the image data to display the image. The noises interfere with the touch detection. The drive circuitry 440 synchronizes the timing of the display driving signal DDS with the sense circuitry 430 through the control signal CS so that the sense circuitry 430 can determine the timing or the frequency of the touch driving signal TDS according to the timing of the display driving signal DDS to avoid the noises. The sense circuitry 430 notifies the drive circuitry 440 of the timing or the frequency of the touch driving signal TDS through the control signal CS. The drive circuitry 440 sends the touch driving signal TDS to the capacitive touch sensor 18 according to the notification of the sense circuitry 430.

Figure 5:
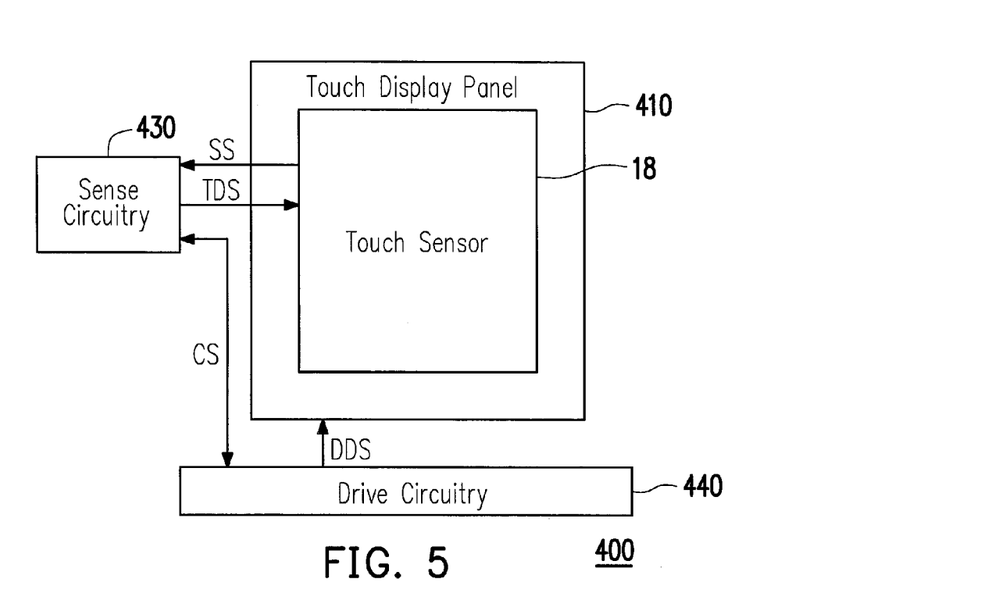
FIG. 5 is a schematic diagram showing an electronic device according to another embodiment of the present invention.

FIG. 5 is a schematic diagram showing the electronic device 400 according to another embodiment of the present invention. In this embodiment, it is the sense circuitry 430 that sends the touch driving signal TDS to the capacitive touch sensor 18 of the touch display 410.

Figure 6:
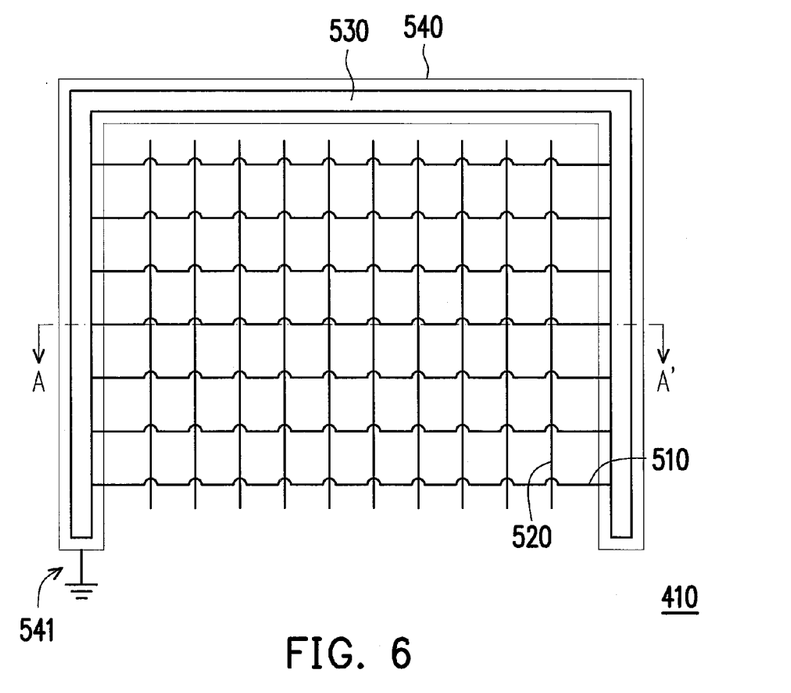
FIG. 6, FIG. 7 and FIG. 8 are schematic views from above of parts of some touch display panels according to some embodiments of the present invention.

FIG. 6 is a schematic view from above of a part of the touch display 410 according to an embodiment of the present invention. The touch display panel 410 includes a plurality of first electrodes such as a plurality of drive lines (the horizontal lines, such as the drive line 510), a plurality of second electrodes such as a plurality of sense lines (the vertical lines, such as the sense line 520), a transmitting circuit 530, and a grounding electrode 540. The drive lines are coupled to the transmitting circuit 530. The transmitting circuitry 530 is coupled to the drive circuitry 440 and distributes the touch driving signal TDS to the drive lines in the display panel 410. The sense lines generate the sense signal SS in response to the touch driving signal TDS. The drive lines and the sense lines constitute the capacitive touch sensor 18. The grounding electrode 540 is a grounded conductor disposed over the transmitting circuit 530 and covering the transmitting circuit 530.

The sense circuitry 430 is coupled to the plurality of second electrodes for receiving the sense signal generated by the plurality of second electrodes. The drive circuitry 440 is coupled to the transmitting circuit 530 and generates the touch driving signal TDS for driving the plurality of first electrodes.

In this embodiment, the grounding electrode 540 is grounded at only one end 541. The transmitting circuit 530 and the grounding electrode 540 are disposed at the edge of the display panel 410 or at least one side of the second electrodes. The grounding electrode 540 is configured to electrically connecting to a ground and is disposed above and at least partially overlapped with the transmitting circuit 530. The grounding electrode may be placed on the liquid crystal layer or placed on the second substrate in the same layer as the plurality second electrodes. The grounding electrode may not connect to the plurality of second electrodes and it is grounded so electric field generated by the switch circuit may be received by the grounding electrode and the energy generated by the electric field is grounded to the Earth. The ground or Earth can refer to the reference point in an electrical circuit from which other voltages are measured, or a common return path for electric current, or a direct physical connection to the Earth.

Figure 7:
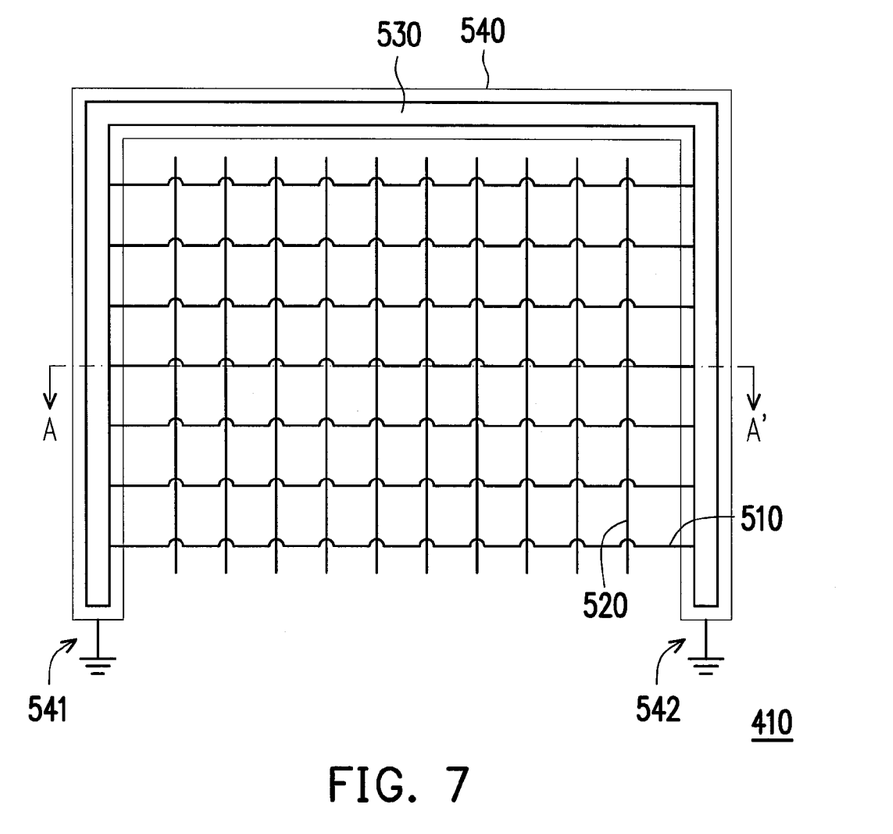

FIG. 7 is a schematic view from above of a part of the touch display panel 410 according to another embodiment of the present invention. In this embodiment, the grounding electrode 540 is grounded at both ends 541 and 542. It is noted that the grounding electrode may be places on at least one side around the plurality of second electrodes. The transmitting circuit may be disposed on at least one side of the plurality of first electrodes and the ground electrode is place to cover the side that has the transmitting circuit coupled to the plurality of first electrodes.

Figure 8:
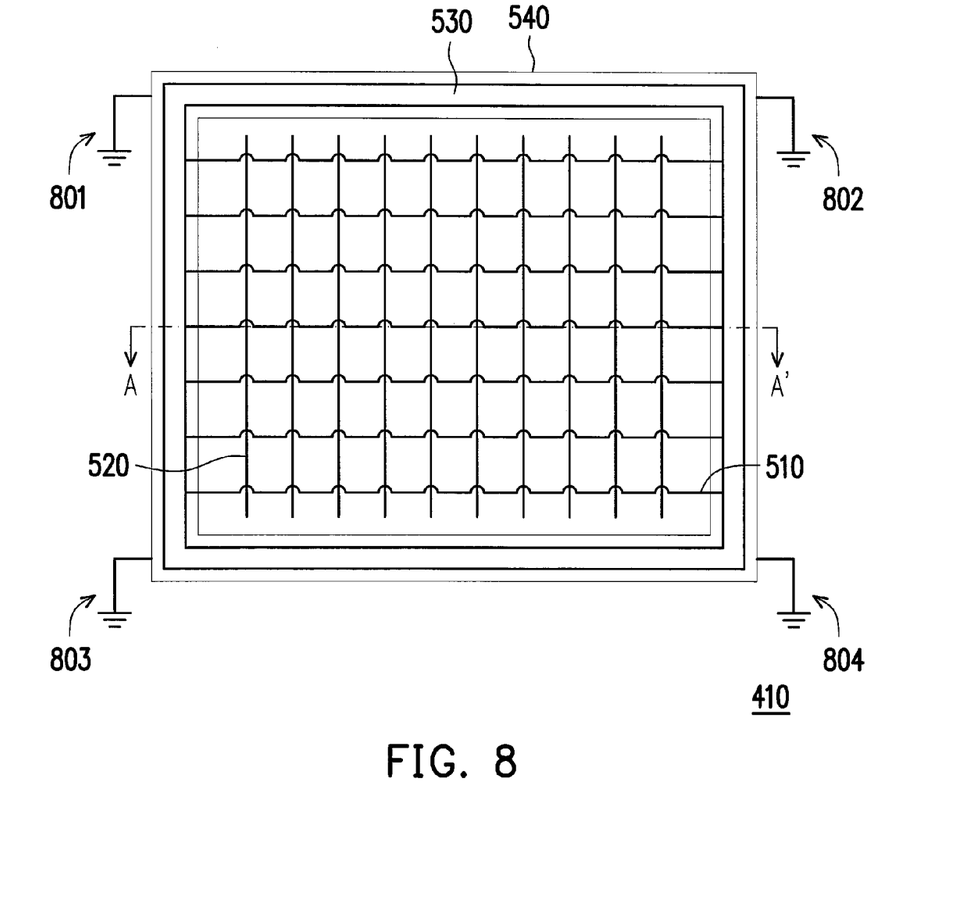

FIG. 8 is a schematic view from above of a part of the touch display panel 410 according to another embodiment of the present invention. In the previous two embodiments, the transmitting circuit 530 and the grounding electrode 540 are disposed on three sides of the plurality of second electrodes. In this embodiment, the transmitting circuit 530 and the grounding electrode 540 are disposed on all four sides of the border of the touch display 410. Moreover, the grounding electrode 540 includes a plurality of grounding points 801-804. Each of the grounding points 801-804 is grounded. The grounding shield 540 can prevent the fringe electric field originating in the transmitting circuit 530 from reaching the sense lines. The more the grounding points of the grounding shield 540, the better the shielding effect of the grounding shield 540.

Figure 9:
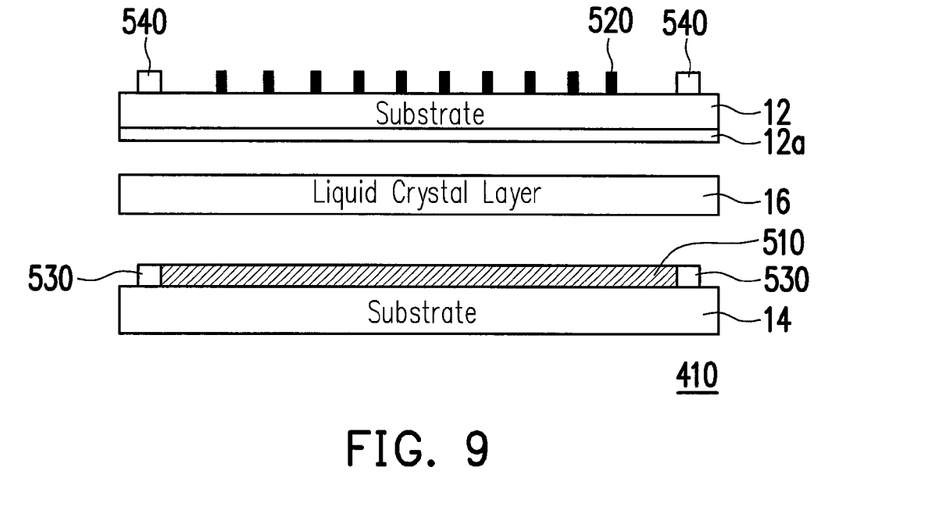
FIG. 9 is a cross-sectional view of a touch display according to an embodiment of the present invention.

FIG. 9 is a cross-sectional view of the AA' line in FIG. 6, FIG. 7 or FIG. 8 according to an embodiment of the present invention. The cross-sectional view of the AA' line is the same in the embodiments corresponding to FIG. 6, FIG. 7 and FIG. 8. The touch display panel 410 includes a touch sensor having a plurality of first electrodes 510 for receiving a touch driving signal and a plurality of second electrodes 520 for generating a sense signal according to the touch driving signal, a first substrate 14, a second substrate 12 disposed opposite to and above the first substrate 14. The plurality of second electrodes 520 is disposed on the second substrate 12. The touch display panel 410 further includes a liquid crystal layer 16 disposed between the first substrate 14 and the second substrate 12. The touch display panel 410 further includes a transmitting circuit 530 for transmitting the touch driving signal to the plurality of first electrodes 510. The transmitting circuit 530 and the plurality of first electrodes 510 are disposed between the first substrate 14 and the liquid crystal layer 16 or between the second substrate 12 and the liquid crystal layer 16. The touch display panel 410 further includes a grounding electrode 540 configured to electrically connecting to a ground and disposed above and at least partially overlapped with the transmitting circuit 530. The transmitting circuit 530 and the plurality of first electrode such as the drive lines are disposed in the same layer of the display panel 410. The transmitting circuit may be disposed on a layer different from that of the plurality of first electrodes and coupled to the plurality of first electrodes. The sense lines (such as the sense line 520) are disposed on the second substrate 12. The sense lines are disposed above the transmitting circuit 530 and the drive lines. The grounding electrode 540 and the sense lines are disposed in the same layer of the touch display 410. The grounding electrode 540 may be placed in a layer different from that of the plurality of second electrodes. The grounding electrode 540 may be disposed between the second substrate 12 and the liquid crystal layer 16 or between liquid crystal layer 16 and the first substrate 14. The grounding electrode 540 is configured to be disposed above the transmitting circuit 530 to receive energy or electric field generate by the transmitting circuit 530.

The plurality of first electrodes 510 is disposed between the liquid crystal layer 16 and the first substrate 14 for receiving the touch driving signal for driving the touch sensor and receiving a driving signal for driving the liquid crystal layer 16. The transmitting circuit 530 may include a switch circuit for switching between the touch driving signal for driving the touch sensor and the driving signal for driving liquid crystal layer to the plurality of first electrodes 510. The driving signal may be a common voltage for driving the liquid crystal layer 16.

Figure 10:
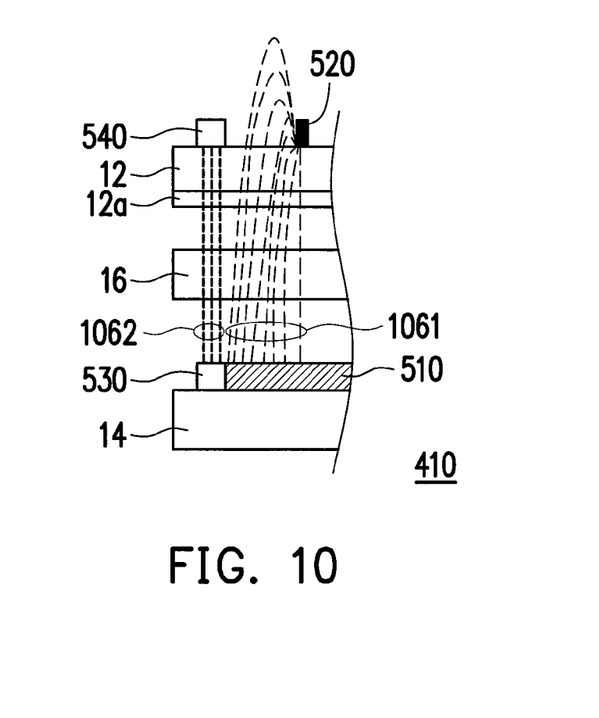
FIG. 10 is a schematic diagram showing the electrical field in a part of a touch display panel according to an embodiment of the present invention.

FIG. 10 is a schematic diagram showing the electrical field in a part of the display panel 410 according to an embodiment of the present invention. When the transmitting circuit 530 transmits the touch driving signal TDS to the plurality of first electrodes 510, the electric field is generated. The electric field includes a normal electric field 1061 extending from the first electrode 510 and received by the second electrode 520 and a fringe electric field 1062 extending from the transmitting circuit 530 and received by the grounding electrode 540. The normal electric field 1061 and the fringe electric field 1062 are depicted by two types of dot lines in FIG. 10. As shown in FIG. 10, the grounding electrode 540 can prevent the fringe electric field 1062 from being received by the second electrode 520. Therefore, the field strength at the sense lines is not affect by the fringe electric field 1062 from the transmitting circuit 530, thus eliminating the interference with the sense signal SS caused by the fringe electric field 1062.

Figure 11:
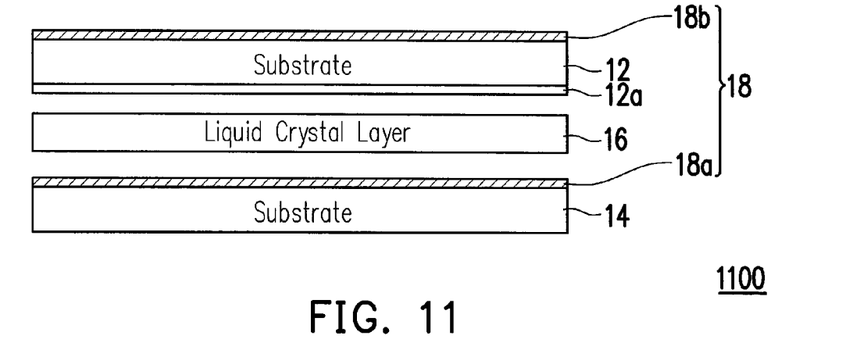
FIG. 11 to FIG. 15 are schematic cross-sectional views of touch display panels according to some embodiments of the present invention.

FIG. 11 is a schematic cross-sectional view of a display panel 1100 as an in-cell display according to an embodiment of the present invention. The display panel 1100 is integrated with a touch sensor 18, which receives a touch driving signal and generates a sense signal according to the touch driving signal. The display panel 1100 includes a first substrate 12, a second substrate 14 opposed to the first substrate 12, a liquid crystal layer 16 disposed between the first substrate 14 and the second substrate 12, a driving layer 18a which includes a transmitting circuit for transmitting the touch driving signal to the touch sensor 18, and a sensing layer 18b with a grounding electrode disposed above the transmitting circuit and covering the transmitting circuit. The touch sensor 18 includes a plurality of first electrodes disposed in the driving layer 18a for receiving the touch driving signal and a plurality of second electrodes disposed in the sensing layer 18b on the second substrate 12 for generating the sense signal according to the touch driving signal. The transmitting circuit is coupled to the plurality of first electrodes for transmitting the touch driving signal to the plurality of first electrodes. The plurality of first electrodes is disposed between the liquid crystal layer 16 and the first substrate 14 for receiving the touch driving signal for driving the touch sensor 18 and receiving a driving signal for driving the liquid crystal layer 16. The transmitting circuit further includes a switch circuit for switching between the touch driving signal for driving the touch sensor 18 and the driving signal for driving the liquid crystal layer 16 to the plurality of first electrodes. A color filter layer 12a is disposed over the liquid crystal layer 16. The transmitting circuit may further includes a driving circuit or shift register for sequentially drive the plurality of first electrodes or supply a common voltage to the plurality for the plurality of first electrodes for driving the liquid crystal layer 16. In fact, the touch display panel 1100 has the same structure as that of the touch display panel 410 in the previous embodiments.

Figure 12:
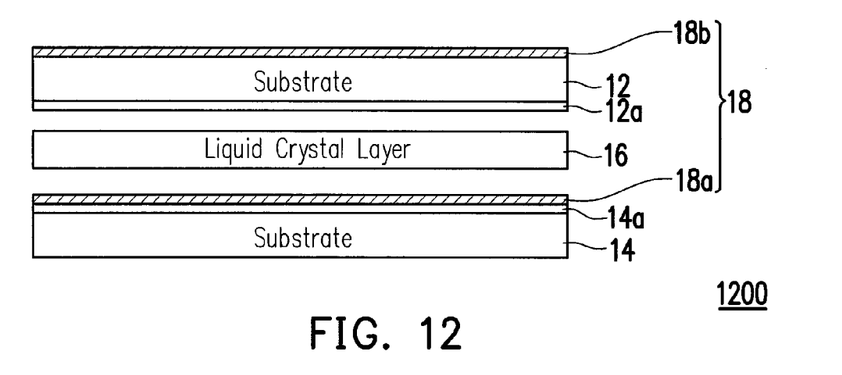

FIG. 12 is a schematic cross-sectional view of a touch display panel 1200 according to an embodiment of the present invention. The touch display panel 1200 is integrated with a touch sensor 18, which receives a touch driving signal and generates a sense signal according to the touch driving signal. The display panel 1200 includes a first substrate 12, a second substrate 14 opposed to the first substrate 12, a liquid crystal layer 16 disposed between the first substrate 14 and the second substrate 12, a driving layer 18a which includes a transmitting circuit for transmitting the touch driving signal to the touch sensor 18, and a sensing layer 18b with a grounding electrode disposed above the transmitting circuit and covering the transmitting circuit. The touch sensor 18 includes a plurality of first electrodes disposed in the driving layer 18a for receiving the touch driving signal and a plurality of second electrodes disposed in the sensing layer 18b on the second substrate 12 for generating the sense signal according to the touch driving signal. The driving layer 18a which includes the plurality of first electrodes is disposed between the liquid crystal layer 16 and the first substrate 14. The display panel 1200 further includes a display driving layer 14a which includes a plurality of third electrodes disposed between the liquid crystal layer 16 and the first substrate 14 for receiving a driving signal for driving the liquid crystal layer 16. The transmitting circuit is disposed at least one side of the plurality of first electrodes and coupled to the plurality of first electrodes for transmitting the touch driving signal to the plurality of first electrodes.

Figure 13:
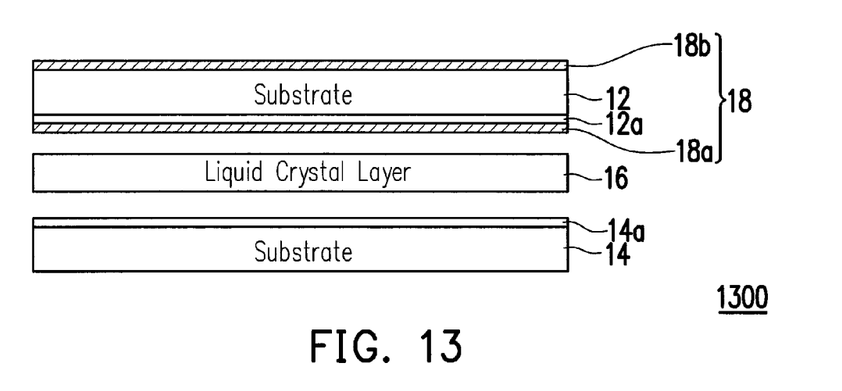

FIG. 13 is a schematic cross-sectional view of a touch display panel 1300 according to an embodiment of the present invention. The touch display panel 1300 is integrated with a touch sensor 18, which receives a touch driving signal and generates a sense signal according to the touch driving signal. The display panel 1300 includes a first substrate 12, a second substrate 14 opposed to the first substrate 12, a liquid crystal layer 16 disposed between the first substrate 14 and the second substrate 12, a driving layer 18a which comprises a transmitting circuit for transmitting the touch driving signal to the touch sensor 18, and a sensing layer 18b with a grounding electrode disposed above the transmitting circuit and covering the transmitting circuit. The touch sensor 18 includes a plurality of first electrodes disposed in the driving layer 18a for receiving the touch driving signal and a plurality of second electrodes disposed in the sensing layer 18b on the second substrate 12 for generating the sense signal according to the touch driving signal. The driving layer 18a which comprises the plurality of first electrodes is disposed between the liquid crystal layer 16 and the second substrate 12. The display panel 1300 further includes a display driving layer 14a which includes a plurality of third electrodes disposed between the first substrate 14 and the liquid crystal layer 16 to receive a driving signal for driving the liquid crystal layer 16. The transmitting circuit is disposed in the driving layer 18a and placed at least one side of the plurality of first electrodes and coupled to the plurality of first electrodes for transmitting the touch driving signal to the plurality of first electrodes.

Figure 14:
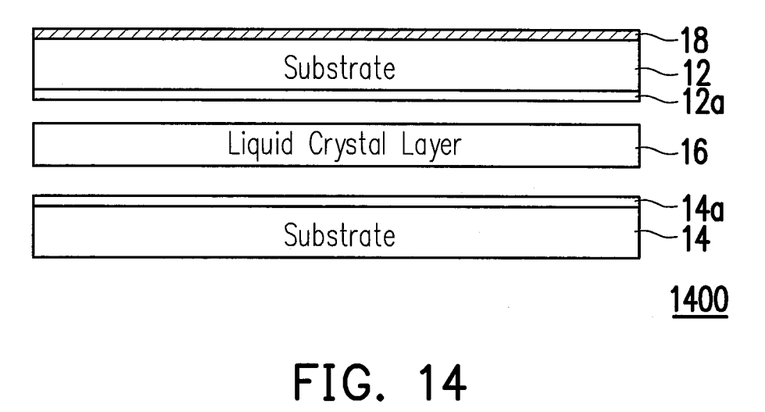

FIG. 14 is a schematic cross-sectional view of a touch display panel 1400 according to an embodiment of the present invention. In the touch display panel 1400, the first electrodes and the second electrodes of the capacitive touch sensor 18 are fabricated into a single driving layer 18 disposed over the second substrate 12. The first and the second electrodes are both disposed in the driving layer 18.

Figure 15:
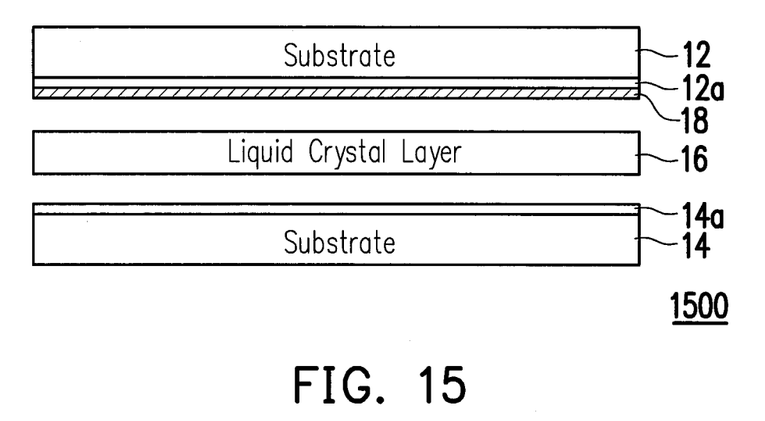

FIG. 15 is a schematic cross-sectional view of a touch display panel 1500 according to an embodiment of the present invention. The touch display panel 1500 is similar to the touch display panel 1400. The difference is that, in the touch display panel 1500, the single driving layer 18 is disposed between the liquid crystal layer 16 and the color filter layer 12a.

Each of the display panels 1100-1500 may include a transmitting circuit and a grounding electrode like the touch display panel 410 does. In each of the touch display panels 1100-1500, the transmitting circuit and the drive lines may be disposed in the same layer of the touch display panel. Alternatively, the transmitting circuit and the drive lines may be disposed in different layers of the touch display panel. In each of the touch display panels 1100-1500, the grounding electrode and the sense lines may be disposed in the same layer of the touch display panel. Alternatively, the grounding electrode may be disposed in a layer between the transmitting circuit and the sense lines.

The touch display panels 1100 and 1200 are applicable to the electronic device 400 shown in FIG. 4 and FIG. 5, wherein the touch driving signal TDS is provided by the sense circuitry 430 or the drive circuitry 440. The touch display panels 1300, 1400 and 1500 are applicable to the electronic device 400 shown in FIG. 5, wherein the touch driving signal TDS is provided by the sense circuitry 430.

In summary, the present invention provides a touch display panel and an electronic device that include a grounding electrode to prevent the fringe electric field from interfering with the touch detection, which improve touch performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch display panel comprising:
   a touch sensor having a plurality of first electrodes for receiving a touch driving signal and a plurality of second electrodes for generating a sense signal according to the touch driving signal;
   a first substrate;
   a second substrate disposed opposite to and above the first substrate, wherein the plurality of second electrodes are disposed on the second substrate;
   a liquid crystal layer disposed between the first substrate and the second substrate;
   a transmitting circuit for transmitting the touch driving signal to the plurality of first electrodes, wherein the transmitting circuit and the plurality of first electrodes are disposed between the first substrate and the liquid crystal layer or between the second substrate and the liquid crystal layer; and
   a grounding electrode configured to electrically connect to a ground and disposed above and at least partially overlapped with the transmitting circuit, and configured to shield an electrical field generated by the transmitting circuit when the transmitting circuit is transmitting the touch driving signal.

2. The touch display panel of claim 1, wherein the grounding electrode is further configured to receive the electrical field generated by the transmitting circuit.

3. The touch display panel of claim 1, wherein the grounding electrode is disposed on at least one side of the plurality of first electrodes on the second substrate.

4. The touch panel of claim 1, wherein the grounding electrode is grounded at one or more ends.

5. The touch display panel of claim 1, wherein the grounding electrode comprises a plurality of grounding points and each of the grounding points is grounded.

6. The touch display panel of claim 1, wherein the plurality of first electrodes is disposed between the liquid crystal layer and the first substrate, and the touch display panel further comprises a plurality of third electrodes disposed between the liquid crystal layer and the first substrate for receiving a driving signal for driving the liquid crystal layer and the transmitting circuit is disposed on at least one side of the plurality of first electrodes and coupled to the plurality of first electrodes for transmitting the touch driving signal to the plurality of first electrodes.

7. The touch display panel of claim 1, wherein the plurality of first electrodes is disposed between the liquid crystal layer and the second substrate, and the touch display panel further comprises a plurality of third electrodes disposed between the first substrate and the liquid crystal layer to receive a driving signal for driving the liquid crystal layer and the transmitting circuit is disposed on at least one side of the plurality of first electrodes and coupled to the plurality of first electrodes for transmitting the touch driving signal to the plurality of first electrodes.

8. The touch display panel of claim 1, wherein the plurality of first electrodes is disposed between the liquid crystal layer and the first substrate for receiving the touch driving signal for driving the touch sensor and receiving a driving signal for driving the liquid crystal layer, and the transmitting circuit further comprises a switch circuit for switching one of the touch driving signal and the driving signal to the plurality of first electrodes.

9. The touch display panel of claim 8, wherein the driving signal is a common voltage for driving the liquid crystal layer.

10. The display panel of claim 1, wherein the grounding electrode and the plurality of second electrodes are disposed on the second substrate.

11. The touch display panel of claim 1, wherein the transmitting circuit and the plurality of first electrodes are disposed in a same layer on the first substrate.

12. An electronic device, comprising:
a touch display panel comprising:
   a touch sensor having a plurality of first electrodes for receiving a touch driving signal and a plurality of second electrodes for generating a sense signal according to the touch driving signal;
   a first substrate;
   a second substrate disposed opposite to and above the first substrate, wherein the plurality of second electrodes are disposed on the second substrate;
   a liquid crystal layer disposed between the first substrate and the second substrate;
   a transmitting circuit for transmitting the touch driving signal to the plurality of first electrode, wherein the transmitting circuit and the plurality of first electrodes are disposed between the first substrate and the liquid crystal layer or between the second substrate and the liquid crystal layer; and
   a grounding electrode configured to electrically connect to a ground and disposed above and at least partially overlapped with the transmitting circuit, and configured to shield an electrical field generated by the transmitting circuit when the transmitting circuit is transmitting the touch driving signal;
a sense circuitry, coupled to the plurality of second electrodes for receiving the sense signal generated by the plurality of second electrodes; and
a drive circuitry, coupled to the transmitting circuit and generating the touch driving signal for driving the plurality of first electrodes.

13. The electronic device of claim 12, wherein the driving signal is a common voltage for driving the liquid crystal layer.

14. The electronic device of claim 12, wherein the grounding electrode is further configured to receive the electrical field generated by the transmitting circuit.

15. The electronic device of claim 12, wherein the grounding electrode is disposed on at least one side of the plurality of second electrodes.

16. The display panel of claim 12, wherein the grounding electrode and the plurality of second electrodes are disposed on the second substrate.

17. The display panel of claim 12, wherein the transmitting circuit and the plurality of first electrodes are disposed on the first substrate.

18. The electronic device of claim 12, wherein the grounding electrode is grounded at one or more ends.

19. The electronic device of claim 12, wherein the grounding electrode comprises a plurality of grounding points and each of the grounding points is grounded.

20. The electronic device of claim 12, wherein the plurality of first electrodes is disposed between the liquid crystal layer and the first substrate, and the drive circuitry generates a driving signal for driving the liquid crystal layer and the touch display panel further comprises a plurality of third electrodes coupled to the drive circuitry and disposed between the liquid crystal layer and the first substrate to receive the driving signal and the transmitting circuit is coupled to the plurality of first electrodes and disposed on at least one side of the plurality of first electrodes for transmitting the touch driving signal from the drive circuitry to the plurality of first electrodes.

21. The electronic device of claim 12, wherein the plurality of first electrodes is disposed between the liquid crystal layer and the second substrate and the drive circuitry generates a driving signal for driving liquid crystal layer and the touch display panel further comprises a plurality of third electrodes coupled to the drive circuitry and disposed between the first substrate and the liquid crystal layer to receive the driving signal and the transmitting circuit is coupled between the drive circuitry and the plurality of first electrodes and disposed on at least one side of the plurality of first electrodes.

22. The electronic device of claim 12, wherein the drive circuitry generates a driving signal for driving the liquid crystal layer and the plurality of first electrodes is disposed between the liquid crystal layer and the first substrate for receiving the touch driving signal and receiving the driving signal, and the transmitting circuit further comprises a switch circuit for switching one of the touch driving signal and the driving signal to the plurality of first electrodes.

* * * * *